May 24, 1966  R. S. ALTMAN  3,252,406
GRAIN COOKER SYSTEM
Filed April 12, 1963
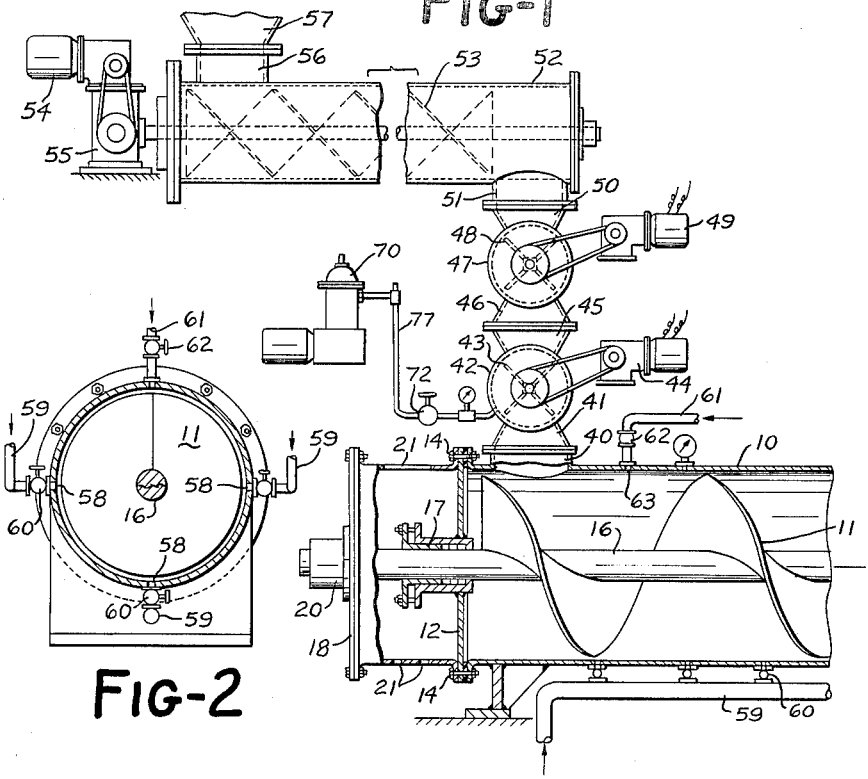
FIG-1
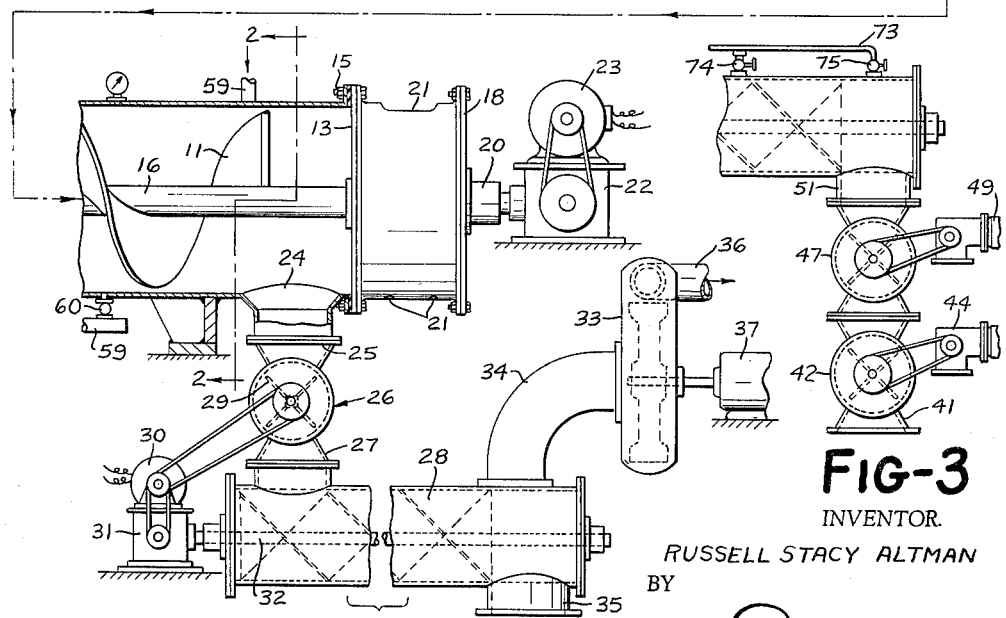
FIG-2
FIG-3
INVENTOR.
RUSSELL STACY ALTMAN
BY United States Patent Office 3,252,406
Patented May 24, 1966

3,252,406
GRAIN COOKER SYSTEM
Russell Stacy Altman, 334 Center Highway W.,
Irwin, Pa.
Filed Apr. 12, 1963, Ser. No. 272,666
3 Claims. (Cl. 99—443)

The present invention relates to the cooking of grains, and is particularly concerned with a method and apparatus for effecting the cooking of grains such as soy beans and the like in a continuous operation. The present application is an improvement over the apparatus and method disclosed in my co-pending applications Serial No. 101,432, filed April 7, 1961, and Serial No. 158,087, filed December 8, 1961, now Patent No. 3,181,955.

The cooking of grains is an important commercial operation and particularly for stock food and the like which is carried out in large volume. The cooking of grains in batches, as has been heretofore, is not particularly desirable because of the discontinuity of the process and the loss of heat that goes along with a process of this nature and the relatively small quantities of grain that can be processed at any one time.

Continuous cooking arrangements for grains and the like have been proposed but heretofore, these have involved the use of expensive and troublesome equipment and use of special seal arrangements to isolate the cooking chamber and other devices that have proved to be unsatisfactory in operation.

One of the great difficulties encountered in cooking grains is that the grains are cooked in an atmosphere of steam under pressure to provide both heat and moisture to the grain, and it is essential that this steam be contained within the cooker, particularly at the inlet end, not only in order to promote proper cooking but in order to prevent incoming dry grain from absorbing moisture from the steam and swelling and clogging the feeding apparatus supplying the raw grain to the cooker.

In my prior applications I disclose an arrangement that has been satisfactory for permitting the cooking of grains in a continuous cycle without steam from the cooker effecting the incoming raw grain. In brief, this is accomplished by separating the raw grain feeder from the cooker by a trap and supplying air under pressure either to the trap or to the discharge end of the feeder so that the air pressure developed in that portion of the apparatus prevents steam from passing from the cooker backwardly through the trap and into the grain feeder. This arrangement was developed after long test and experimentation, and apparently was the key to the successful processing of grains through a cooker on a continuous cycle.

On an occasion when the air supply to the apparatus was interrupted however, and there was urgent necessity for maintaining the cooker in operation, the expedient of introducing an additional trap between the feeder and the cooker was tried out. It was felt that the additional trap in series with the trap formerly employed would provide an arrangement that would prevent steam from passing backwardly through the traps to the feeder. What occurred however was that this arrangement was inoperative in that a cycle could not be commenced and it was found that the steam would pass backwardly through the double trap arrangement and into the feeder in somewhat the same manner as it had done previously with a single unpressurized trap.

The air supply was then connected to the trap arrangement as before so that the air pressure would prevent steam from passing backwardly through the traps. With the air pressure supplied the double trap arrangement, of course, operated satisfactorily as could be expected, since a supply of air pressure to a single trap will cause satisfactory operaton. However, after the cooking cycle had been commenced, the air pressure was turned off as an experiment and it was discovered that once the cycle had been started, with the double trap arrangement, the supply of air pressure was no longer necessary to have satisfactory working conditions. The exact reason for this is not known, but presumably the volume of grain passing through the traps prevents any steam from moving backwardly through the traps into the feeder, or there is condensation of the steam in the traps before the steam gets back to the feeder, and which condensed steam is carried along with the grain to the cooker. In any case, the addition of a second trap in series with the first trap resulted in an arrangement that required the pressurizing of the region of at least one of the discharge end of the feeder and the traps in order to start the cooking cycle while thereafter, once the cycle had started, the air pressure could be cut off.

The described arrangement is slightly more expensive in that it involves an additional trap, but is considerably more economical to operate because no air pressure is required after the cooking cycle has been started.

With the foregoing in mind, it will be evident that a primary object of the present invention is an improved method of cooking grains in a continuous cycle.

Still another object of this invention is the provision of an apparatus in which grains can be cooked in a continuous cycle.

A still further object of the invention is the provision of a method and apparatus for cooking grains in a continuous cycle in which great economy can be observed.

The foregoing objects of this invention as well as other objects and advantages thereof will become more clearly apparent upon reference to the following specification taken in connection with the accompanying drawings in which:

FIGURE 1 is a somewhat diagrammatic view partly in section, of a continuous cooker according to the present invention having a grain feeder connected to the inlet thereof and a grain cooler and dryer connected to the discharge thereof;

FIGURE 2 is a cross sectional view indicated by line 2—2 on FIGURE 1, and

FIGURE 3 is a fragmentary view showing a modified arrangement for the compressed air supply to the region where the feeder discharges into the traps through which the grain passes to the cooker.

Referring to the drawings somewhat more in detail, the cooker shown in FIGURE 1 has an elongated tube 10 forming a cooking chamber within which is located a grain advancing device such as rotatable screw 11. The cooker pipe has its ends flanged and is closed by end members 12 and 13 attached to the flanges as by bolts 14 and 15. The end members carry seals for sealing about shaft 16 of the screw 11, one of said seals being indicated at 17 in connection with end member 12. Spaced outwardly from each end member is a bearing support member 18 in which members are the bearing 20 rotatably supporting shaft 16. The spaces between members 12 and 18 and between members 13 and 18 are preferably ventilated as by apertures 21 so that air passing therethrough will cool the seals and bearings and in particular, will isolate the bearings from the high temperature established within cooker tube 10.

For rotating screw 11, shaft 16 has connected thereto, via speed reducer 22, an electric drive motor 23. The speed of the screw can be controlled, of course, by controlling the speed of the motor or by adjusting the drive ratio of speed reducer 22.

The discharge end of the cooker tube terminates in an opening 24 in the bottom of the tube which communicates with inlet 25 of a trap 26 that has an outlet 27 leading into the inlet end of a screw feeder or compresser 28. The bladed wheel 29 of trap 26 is driven in rotation by a motor 30, and this motor may also drive through a transmission 31 into a screw 32 located in the tube of feeder 28.

The feeder 28 compresses and advances cooked grain delivered thereto, and cooling of the grain is also effected by air moved therethrough by a blower 33 which has its inlet connected by conduit 34 with a top of feeder 28 above the discharge 35 of the feeder, while the discharge side of the blower is indicated at 36. This blower is driven by motor 37. The blower provides for cooling of the cooked grain and also carries off water vapor being given up by the cooked grain, so that there is a simultaneous cooling and drying action taking place in the discharge end of feeder 28. This feeder, by providing the tube thereof with apertures, can also expel water from the grain as it is moved through the feeder so that this portion of the apparatus can accomplish dewatering, drying and cooling, as well as feeding of the cooked grain into a point of discharge.

Turing now to the inlet end of the cooker, the cooker is provided with a flanged inlet fitting 40 in the top at the left end and connected thereto is the outlet end 41 of a first trap having a cylindrical portion or housing 42 in which there is rotatably mounted a bladed wheel 43 that is attached to a pulley driven by a motor 44. This trap has an inlet end 45 that communicates with outlet end 46 of a second trap 47, which also has a bladed wheel 48 therein to which is connected a pulley driven by motor 49.

The inlet end 50 of the second trap 47 communicates with the flanged outlet 51 of a feeder which comprises a feed tube 52 in which is rotatably mounted a feed screw 53. Screw is driven by motor 54 via a speed reducer 55 and one or the other of the motor and speed reducer can be adjustable to vary the speed of screw 53.

At the top at the left end, tube 52 has an outlet 56 with which a hopper 57 communicates for the supply of gain to the feeder.

In coker 10, the grain is subjected to the action of steam under pressure which is supplied thereto by way of nozzle means 58 distributed, for example, along the bottom and sides of the cooker, and to each nozzle means are connected the conduit means 59 through which steam is supplied to the nozzle means. For adjusting the distribution and quantity of the supplied steam, each nozzle means has associated therewith an adjustable control valve 60.

Additional moisture can be supplied to the grain being cooked if so desired by way of a water supply valve 61 having a control valve 62 therein and terminating in a nozzle 63.

The aforementioned supply of compressed air to the trap means may be effected at substantially any convenient position therealong but it has been found satisfactory to supply this air from a source 70 by way of a conduit 77 and a control valve 72 to a point on the lower trap 42 as illustrated in FIGURE 1. This supply of air under pressure appears to inhibit movement of steam upwardly through the traps so that none gets to the feeder and, as explained hereinbefore, after the cooking cycle has been commenced, valve 72 can be closed and there will be no steam escape through the traps from the cooker into the feed tube 52.

I have also found that the feeder 52, 53 itself could be pressurized toward the discharge end thereof, as indicated in FIGURE 3, in order to hold back the steam while the cooker is being put into operatoin. FIGURE 3 shows an air pressure supply line 73 supplying air through valves 74 and 75 to the region of the discharge end of the feeder. This arrangement has also proved satisfactory for permitting the cooker to be started, and once the cooking operation is in progress, valves 74 and 75 can be closed. It will be evident that it is contemplated that a supply of air under pressure will be delivered to the region consisting of the discharge portion of the feeder and the trap means between the feeder and the cooker. It is further contemplated that the supply of air will take place only while commencing the cooking operation, and that it will be interrupted after the operation is in progress.

The steam pressure in the cooker may vary from the region of from 5 to 9 pounds, for example, in which case I find that air pressure on the order of from 5 to 10 pounds is satisfactory for accomplishing the objects of the present invention.

The feeder tube 52 may be on the order of about 5 feet in length and it is ordinarily sufficient full of grain to prevent any substantial loss of air therethrough even when the air is supplied in the region of the discharge end of the feeder. Even when the air is supplied to the feeder itself near the discharge end, sufficient pressure will be exerted downwardly through the traps to prevent flow of steam therethrough.

With respect to a typical cooking operation, the main cooker tube may have a diameter of 18 inches and a length up to 36 feet, while the tube of the discharge feeder may have a diameter of 9 inches and a length of 12 feet. Cooking may be carried out at temperatures on the order of from 150° to 230° F., and grain may be fed into the cooker at the rate of from 100 to 400 pounds per minute.

The discharged grain may be further treated as desired, such as by flaking or pelletizing, and it will usually require further drying after it is discharged in order to reduce the moisture content.

The traps that have been referred to will operate satisfactorily if the blades of the rotary portions turn inside the cylindrical housing with the small clearance, but it is also possible for these blades to have resilient sealing strips attached thereto engaging the inside of the housing, if so desired.

The rotor may rotate in the same direction or may rotate in opposite directions and, in the latter case, the grain being fed will form a screen completely across the feed passage to entrap any stream leaking back through the lower trap and carry it back to the cooker tube.

It will be understood that this invention is susceptible to modification in order to adapt it to different usages and conditions; and accordingly, it is desired to comprehend such modifications within this invention as may fall within the scope of the appended claims.

I claim:

1. In a grain cooker system: grain feeder means comprising tubular means having an inlet opening at one end portion and a discharge opening at the other end portion and also comprising continuously operable conveyor means arranged in said tubular means for conveying grain to be cooked from said inlet opening to and through said discharge opening, a tubular cooker arranged substantially below and in spaced relation to said feeder means and having an inlet and an outlet spaced from said inlet in axial direction of said cooker, said feeder means also including a plurality of traps each comprising a housing and a motor driven rotary member therein, said traps being arranged in series with regard to each other and interposed between and connected to said discharge opening of said tubular means and said inlet of said tubular cooker, each of said rotary trap members comprising means for conveying and releasing grain received therein in the direction toward said cooker while preventing direct unimpeded communication between said discharge opening of said tubular means and said cooker, steam supply means connected to said cooker for feeding steam under pressure into said cooker, conduit means adapted to be connected to a source of gas under pressure, said conduit means being connected to a point between the inlet of said cooker and a point of said other end portion of said tubular means and being adapted therebetween to build up a compressed gas barrier of a pressure at least as high as the steam pressure in said cooker to inhibit the escape of steam from said cooker through said traps to said conveyor means when said conduit means is connected to a source of gas under pressure at least as high as the steam pressure in said cooker, and means operable selectively for closing off the supply of gas under pressure into said feeder means through said conduit means to thereby permit continuous feeding of grain through said traps into said cooker without said gas barrier after the cooker has started operation and has been receiving grain in a continuous feeding operation from said tubular means.

2. A grain cooker system according to claim 1, in which said conduit means leads into that one of said traps which is closest to said cooker.

3. A grain cooker system according to claim 1, in which said traps are rotary traps arranged one vertically above the other.

References Cited by the Examiner

UNITED STATES PATENTS

| | | | |
|---|---|---|---|
| 959,448 | 5/1910 | Baxter | 99—443 |
| 1,735,392 | 11/1929 | Hiller. | |
| 2,456,124 | 12/1948 | Hoffman. | |
| 2,486,650 | 11/1949 | Hepp et al. | |
| 2,489,925 | 11/1949 | Omwake. | |
| 2,793,582 | 5/1957 | Rothe et al. | 99—443 |
| 2,801,176 | 7/1957 | Ozai-Durrani | 99—80 |
| 2,838,401 | 6/1958 | Gates | 99—82 |
| 2,898,210 | 8/1959 | Dale et al. | 99—80 |

A. LOUIS MONACELL, *Primary Examiner.*

RAYMOND N. JONES, *Examiner.*